United States Patent Office 2,833,773
Patented May 6, 1958

---

2,833,773
NEW TROPEINE DERIVATIVES

Károly Nádor and László Gyermek, Budapest, Hungary, assignors to "Licencia" Talalmanyokat Ertekesito Vallalat, Budapest, Hungary No Drawing. Application August 6, 1956
Serial No. 602,461

7 Claims. (Cl. 260—292)

This invention is concerned with certain novel tropeine derivatives, more particularly 4-diphenyl-methyl-tropeil-tropinium-halide.

It is an object of this invention to provide a process for the preparation of such compounds.

It is a further object of this invention to provide tropeine derivatives possessing valuable new therapeutic properties.

Further objects of the present invention will appear from the following description.

In the course of our previous investigations we have established that the quaternary tropeines possess ganglionic blocking effect, the term "tropeines" being understood to mean esters of tropine (trans-tropanol) and of $\psi$-tropine (cis-tropanol). The general formula of these compounds is

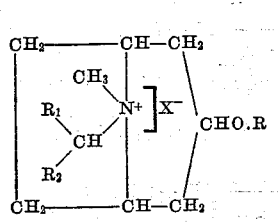

where X is halogen, R an acyl-residue or hydrogen, $R_1$ hydrogen or an alkyl-, aryl-, or aralkyl group and $R_2$ an aryl- or aralkyl-group, if desired, substituted in the nucleus.

Of these compounds we have produced those, wherein $R_1$, $R_2$ and R signify the following substituents:

| | $R_1$ | $R_2$ | R |
|---|---|---|---|
| (1) | H | $-CH_2-C_6H_5$ | $-CO-CH(CH_2-OH)-C_6H_5$ |
| (2) | $-CH_3$ | $-C_6H_5$ | $-CO-CHOH-C_6H_5$ |
| (3) | $-C_6H_5$ | $-C_6H_5$ | $-CO-CHOH-C_6H_5$ |
| (4) | H | $-C_6H_4-Br$ | $-COOCH_3$ |
| (5) | H | $\alpha$-naphthyl | $-CO-CHOH-C_6H_5$ |
| (6) | H | $-C_6H_4-Br$ | $-CO-CHOH-C_6H_5$ |
| (7) | H | $-C_6H_4-Cl$ | $-CO-C_6H_4-NO_2$ |
| (8) | H | $-C_6H_4-Br$ | H |
| (9) | H | p-diphenyl | $-CO-CHOH-C_6H_5$ |
| (10) | H | $-C_6H_4-Br$ | $-CO-C_6H_5$ |

All these quaternary tropane derivatives possess a ganglionic blocking effect, which selectively blocks the autonomic ganglia.

Attempts have been made to produce compounds, which not only paralyze the autonomic ganglia, but also possess a parasympatholytic effect thus combining these two effects in an optimal manner. However, compounds of this kind are not known, and thus part of the known compounds are predominantly ganglionic blocking in their effect, as e. g. tetraethylammonium-bromide, 1,6-hexamethylene-bis-trimethyl-ammonium-bromide, or the tropane derivatives enumerated above under 1–10 whilst in another part of the known compounds the parasympatholytic effect is predominant. Such compounds are e. g. atropine, $\beta$-diethyl-aminoethyl-xanthene-9-carboxylic acid ester-bromomethylate.

It now has surprisingly been found during the course of our investigations, that tropic acid esters of the 4-diphenyl-methyl-tropinium-halides differ from the tropine derivatives enumerated above under 1–10, and possess not only a ganglionic blocking effect but also, a marked parasympatholytic effect. Owing to these special properties our new compounds form the first member of a hitherto unknown series of medicaments. We propose to designate the combined ganglionic blocking effect and parasympatholytic effect by the expression "gangliocholytic."

The invention therefore provides as new compounds, compounds of the general formula

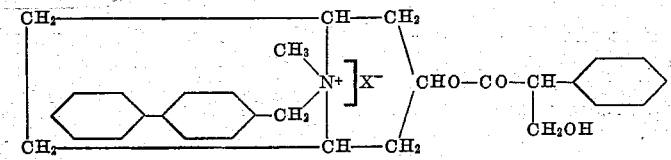

wherein X is halogen.

The invention particularly includes the compound of the above formula in which X is bromine.

For the purpose of production of the new compounds dl-tropeil-tropine may be reacted with a 4-diphenyl-methyl-halide, advantageously in an inert solvent. The course of the reaction is as follows:

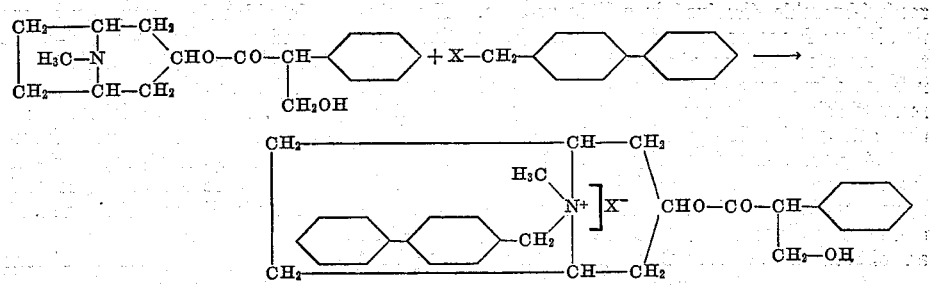

Alternatively dl-tropic acid ester of the tropine may be first reacted with a 4-diphenyl-methyl halide to yield a 4-diphenyl-methyl-tropinium-halide, the OH-group which is present on the 3-carbon atom of which being then acylated with dl-O-acyl-tropic acid-halide followed by deacylation of the O-acyl group:

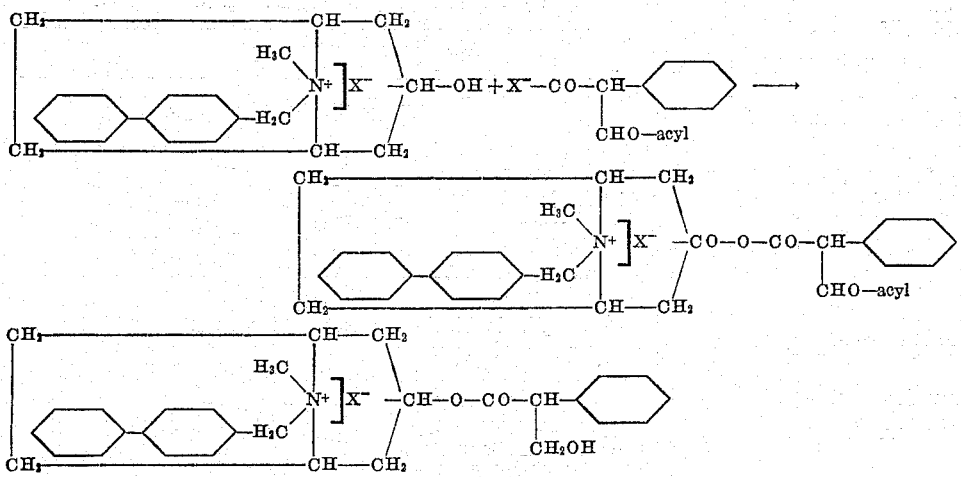

In order that the invention may be well understood the following examples are given only as illustration:

Example 1

28.9 g. of dl-tropic acid ester of the tropine is dissolved in 300 ml. of luke-warm acetone and to the solution are added 25 g. of 4-diphenyl-methyl-bromide, dissolved in 75 ml. of acetone. The solution is kept for 1 hour at room temperature, thereafter during 6 hours at 40–60° C. The separated quaternary salt is filtered off, washed with acetone and dried at gentle heat. Yield 35–39 g. After recystallizing in ethyl alcohol one obtains a snow-white microcrystalline powder which at a heating velocity of 100°/7.5 minutes melts at 220–222° C. with decomposition.

Example 2

14.1 g. of trans-tropanol are dissolved in 150 ml. of acetone and the solution mixed with 24.7 g. of 4-diphenyl-methyl-bromide dissolved in a little acetone. The solution is kept for some hours at about 50° C. and therefater the separated 4-diphenyl-methyl-trans-tropinium-bromide is isolated in the usual manner. Yield about 90%. After recrystallising in ethyl alcohol the compound melts at about 230° with decomposition.

19.4 g. of the quarternary aminoalcohol obtained in the above manner is mixed with 13.5 g. of O-acetyl-dl-tropic acid bromide, in a vessel provided with a tube containing calcium chloride, and the mixture is warmed in an oilbath at 120–130° C. until no more delevopment of hydrogen bromide gas (approx. 3 hours) takes place. For the purpose of splitting of the acetyl-residue the resulting ester is boiled for ½ hour with 50 ml. of 10% hydrobromic acid and the resulting solution evaporated to dryness in vacuo. On recrystallization from alcohol the compound described in Example 1 is obtained, M. P. 221° C.

We claim:

1. As new compounds, compounds of the general formula

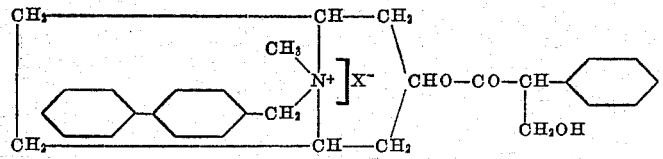

wherein X is halogen.

2. The new compound set forth in claim 1 in which X is bromine.

3. A process for the preparation of the compounds of the formula

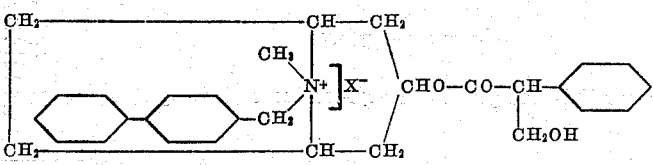

wherein X is halogen, in which the tropic acid ester of the tropine is reacted with a 4-diphenyl-methyl-halide.

4. A process as claimed in claim 3, in which the reaction is carried out in the presence of an inert solvent.

5. A process as claimed in claim 3 in which the 4-diphenyl-methyl-halide is 4-diphenyl-methyl-bromide.

6. A process for the preparation of compounds of the formula

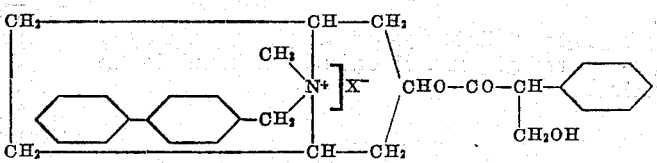

in which the quaternary compound formed from tropanol and a 4-diphenyl-methyl-halide is reacted with an O-acyl-tropic acid-halide and the O-acyl group is then deacylated from the reaction product.

7. A process as claimed in claim 6, in which the quaternary compound formed from tropanol and 4-diphenyl-methyl-tropinium-bromide is reacted with O-acyl-tropic acid bromide and the O-acyl group is then deacylated from the reaction product.

No references cited.